(12) United States Patent
Dohi et al.

(10) Patent No.: US 11,506,249 B2
(45) Date of Patent: Nov. 22, 2022

(54) REVERSE INPUT CUTOFF CLUTCH (71) Applicant: NSK LTD., Tokyo (JP)

(72) Inventors: Nagao Dohi, Kanagawa (JP); Yuya Daikoku, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/596,524

(22) PCT Filed: Nov. 25, 2020

(86) PCT No.: PCT/JP2020/043776
§ 371 (c)(1),
(2) Date: Dec. 13, 2021

(87) PCT Pub. No.: WO2021/152980
PCT Pub. Date: Aug. 5, 2021

(65) Prior Publication Data
US 2022/0205495 A1 Jun. 30, 2022

(30) Foreign Application Priority Data

Jan. 29, 2020 (JP) .............................. JP2020-012185

(51) Int. Cl.
*F16D 43/02* (2006.01)
*F16D 51/18* (2006.01)
(Continued)

(52) U.S. Cl.
CPC ............. *F16D 43/02* (2013.01); *F16D 51/18* (2013.01); *F16D 65/22* (2013.01); *F16D 67/02* (2013.01)

(58) Field of Classification Search
CPC .......... F16D 43/02; F16D 41/10; F16D 67/02; F16D 65/22; F16D 41/084; F16D 41/088;
(Continued)

(56) References Cited

U.S. PATENT DOCUMENTS

| 1,575,038 A | * | 3/1926 | Clas | ...................... E05F 11/382 49/353 |
| 1,617,745 A | * | 2/1927 | Cousinard | ............... F16D 59/02 192/223.3 |

(Continued)

FOREIGN PATENT DOCUMENTS

| EP | 1059195 A2 * 12/2000 ............. B60N 2/444 |
| JP | 2007-232095 A 9/2007 |

(Continued)

OTHER PUBLICATIONS

International Search Report for PCT/JP2020/043776 dated Feb. 9, 2021 [PCT/ISA/210].

(Continued)

*Primary Examiner* — Robert A. Siconolfi
*Assistant Examiner* — Mahbubur Rashid
(74) *Attorney, Agent, or Firm* — Sughrue Mion, PLLC (57) ABSTRACT

The reverse input cutoff clutch comprises a pressed member having a pressed surface, an input member arranged coaxially with the pressed surface and having an input-side engaging portion arranged radially inside the pressed surface, an output member arranged coaxially with the pressed surface and having an output-side engaging portion arranged more radially inside than the input-side engaging portion, and an engaging element arranged radially inside the pressed surface and having a pressing surface facing the pressed surface, an input-side engaged portion that engages with the input-side engaging portions, and an output-side engaged portion that engages with the output-side engaging portion. The output-side engaged portion is configured by a recessed portion, and the interior surface of the recessed portion has a pair of guided surfaces. The output-side engaging portion has a pair of guide surfaces facing the pair of guided surfaces.

2 Claims, 11 Drawing Sheets (51) Int. Cl.
*F16D 65/22* (2006.01)
*F16D 67/02* (2006.01)

(58) Field of Classification Search
CPC .... F16D 41/105; F16D 49/00; F16D 2125/36; F16D 41/06; F16D 43/18; F16D 43/211; F16D 45/00; F16D 13/14; F16D 2127/10; F16D 41/04; F16D 41/067; F16D 51/18; F16D 41/16; F16D 43/20
See application file for complete search history.

(56) References Cited

U.S. PATENT DOCUMENTS

| | | | | |
|---|---|---|---|---|
| 3,051,282 | A * | 8/1962 | Greene | F16B 1/04 |
| | | | | 74/530 |
| 5,067,598 | A * | 11/1991 | Ritter | F16D 41/073 |
| | | | | 192/223.2 |
| 7,051,860 | B2 * | 5/2006 | Scheck | B60N 2/938 |
| | | | | 192/223 |
| 9,455,607 | B2 * | 9/2016 | Mizutani | F16D 43/02 |
| 10,597,926 | B2 * | 3/2020 | Shirai | F16D 41/067 |
| 2003/0173182 | A1 * | 9/2003 | Kim | B60N 2/1882 |
| | | | | 192/223.2 |
| 2005/0189189 | A1 * | 9/2005 | Acosta | F16D 43/02 |
| | | | | 192/223.2 |
| 2006/0175175 | A1 * | 8/2006 | Acosta | F16D 41/10 |
| | | | | 192/12 R |
| 2012/0098367 | A1 * | 4/2012 | Mizutani | F16D 41/10 |
| | | | | 310/76 |
| 2019/0093415 | A1 * | 3/2019 | Shirai | B60J 1/17 |
| 2021/0262532 | A1 * | 8/2021 | Toyoda | F16D 41/10 |

FOREIGN PATENT DOCUMENTS

| | | | | |
|---|---|---|---|---|
| JP | 2019138410 A | * | 8/2019 | |
| JP | 2019190561 A | * | 10/2019 | |
| JP | 2019214240 A | * | 12/2019 | B60N 2/444 |
| WO | 2019/026794 A1 | | 2/2019 | |
| WO | 2019/216280 A1 | | 11/2019 | |

OTHER PUBLICATIONS

Extended European Search Report dated Jul. 8, 2022 in European Application No. 20917248.5.

* cited by examiner

REVERSE INPUT CUTOFF CLUTCH

CROSS REFERENCE TO RELATED APPLICATIONS

This application is a National Stage of International Application No. PCT/JP2020/043776 filed Nov. 25, 2020, claiming priority based on Japanese Patent Application No. 2020-012185 filed Jan. 29, 2020.

TECHNICAL FIELD

The present invention relates to a reverse input cutoff clutch that transmits rotational torque input to an input member to an output member, while completely blocking rotational torque that is reversely input to the output member so as not to transmit it to the input member, or only a part of it is transmitted to the input member and the rest is blocked.

BACKGROUND ART

The reverse input cutoff clutch includes an input member connected to an input-side mechanism such as a drive source and an output member connected to an output-side mechanism such as a deceleration mechanism, and has a function of transmitting rotational torque input to the input member to the output member, while completely blocking rotational torque that is reversely input to the output member so as not to transmit the rotational torque to the input member, or only a part of it is transmitted to the input member and the rest is completely blocked.

The reverse input cutoff clutch is roughly classified into a lock type and a free type according to the difference in the mechanism for blocking the rotational torque that is reversely input to the output member. The lock type reverse input cutoff clutch is provided with a mechanism for preventing or suppressing the rotation of the output member when the rotational torque is reversely input to the output member. On the other hand, the free type reverse input cutoff clutch is provided with a mechanism for idling the output member when a rotational torque is input to the output member. Whether to use the lock type reverse input cutoff clutch or the free type reverse input cutoff clutch is appropriately determined depending on the application and the like of the device incorporating the reverse input cutoff clutch.

For example, JP 2007-232095A describes a lock type reverse input cutoff clutch. The reverse input cutoff clutch described in this publication includes a mechanism in which when rotational torque is reversely input to the output member, the rolling elements respectively arranged in a wedge-shaped space between the inner member and the outer member are moved to the narrower side with regard to the radial direction of the wedge-shaped space so as to be stretched between the inner member and the outer member to prevent the rotation of the output member.

CITATION LIST

Patent Literature

Patent Literature 1: JP 2007-232095A

SUMMARY OF INVENTION

Technical Problem

In the reverse input cutoff clutch described in JP 2007-232095A, rolling elements are respectively meshed into a narrow-width portion with regard to the radial direction of a wedge-shaped space when rotational torque is reversely input to the output member, and this meshing force has a magnitude corresponding to the rotational torque that is reversely input to the output member. Therefore, in a case where this meshing force becomes large, even when torque is subsequently input to the input member, it may be difficult to release the state in which the rolling elements are respectively meshed into a narrow-width portion with regard to the radial direction of the wedge-shaped space, that is, in the state in which the output member is prevented from rotating.

An object of the present invention is to achieve a structure of a reverse input cutoff clutch that makes it possible to easily release the state in which the rotation of the output member is prevented or suppressed.

Solution to Problem

According to one aspect of the present invention, the reverse input cutoff clutch includes a pressed member, an input member, an output member, and at least one engaging element.

The pressed member has a pressed surface on the inner circumferential surface.

The input member has at least one input-side engaging portion arranged radially inside the pressed surface, and is arranged coaxially with the pressed surface.

The output member has an output-side engaging portion arranged radially inside the pressed surface and more radially inside than the input-side engaging portion, and is arranged coaxially with the pressed surface.

The engaging element is arranged radially inside the pressed surface so as to be able to move in the first direction as a direction away from or toward the pressed surface, and have at least one pressing surface facing the pressed surface, an input-side engaged portion that engages with the input-side engaging portion, and an output-side engaged portion that engages with the output-side engaging portion.

When rotational torque is input to the input member, the engaging element displaces so as to move away from the pressed surface based on engagement between the input-side engaging portion and the input-side engaged portion, and by engaging the output-side engaged portion with the output-side engaging portion, transmits rotational torque input to the input member to the output member, and when rotational torque is reversely input to the output member, based on engagement between the output-side engaging portion and the output-side engaging portion, the engaging element frictionally engage the pressing surface with the pressed surface by pressing the pressing surface against the pressed surface.

The output-side engaged portion is configured by a recessed portion provided on a side surface on the side far from the pressed surface in the first direction of the engaging elements.

The recessed portion has an interior surface comprising a pair of guided surfaces that are provided on both side portions in the second direction orthogonal to both the first direction and the axial direction of the pressed surface and face each other in the second direction.

The output-side engaging portion has a pair of guide surfaces at two locations facing the pair of guided surfaces.

When the engaging element displaces in a direction away from the pressed surface with regard to the first direction due to rotational torque being input to the input member, the pair of guided surfaces are guided by the pair of guide surfaces so that the engaging element is restricted from moving in the second direction.

In a reverse input cutoff clutch according to one aspect of the present invention, the pair of guided surfaces may be configured by a pair of concave curved surfaces inclined in a direction in which the distance between each other increases in a direction away from the pressed surface with regard to the first direction, and the pair of guide surfaces may be configured by a pair of convex curved surfaces that is able to contact the pair of concave curved surfaces.

In a reverse input cutoff clutch according to one aspect of the present invention, a pair of the input-side engaging portions and a pair of the engaging elements are provided so as to sandwich the output-side engaging portion from both sides.

Advantageous Effect of Invention

In a reverse input cutoff clutch according to one aspect of the present invention, the state in which the rotation of the output member is prevented or suppressed can be easily released.

DESCRIPTION OF EMBODIMENTS

One Embodiment

FIG. 1 to FIG. 11 illustrate a reverse input cutoff clutch 1 of an example of an embodiment of the present invention. In the following description, the axial direction, the radial direction, and the circumferential direction, unless specified otherwise, mean the axial direction, the radial direction, and the circumferential direction of the reverse input cutoff clutch 1. The axial direction, the radial direction, and the circumferential direction of the reverse input cutoff clutch 1 coincide with the axial direction, the radial direction, and the circumferential direction of the input member 2, and coincide with the axial direction, the radial direction, and the circumferential direction of the output member 3, and coincide with the axial direction, the radial direction, and the circumferential direction of the pressed member 4.

[Explanation of the Structure of the Reverse Input Cutoff Clutch]

The reverse input cutoff clutch 1 of this example is a lock type reverse input cutoff clutch, and includes an input member 2, an output member 3, a pressed member 4, and a pair of engaging elements 5. The reverse input cutoff clutch 1 has a reverse input cutoff function which transmits rotational torque input to the input member 2 to the output member 3 while completely blocking rotational torque that is reversely input to the output member 3 so as not to transmit the rotational torque to the input member 2, or only a part of it is transmitted to the input member 2 and the rest is completely blocked.

Figure 2:
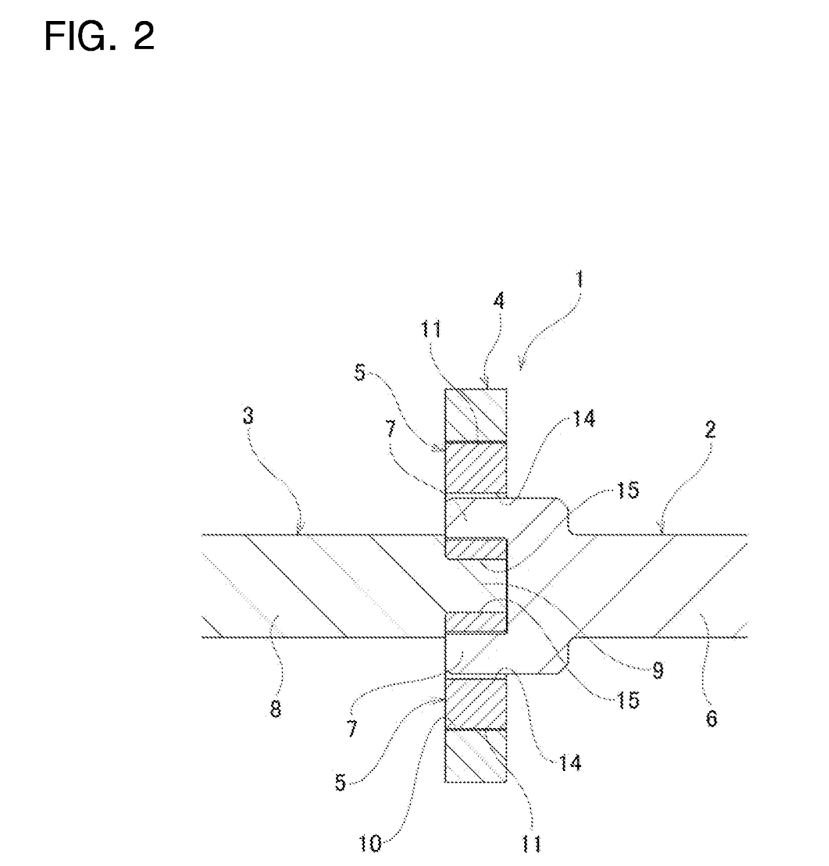
FIG. 2 is a cross-sectional view of section a-a of FIG. 1.
Figure 4:
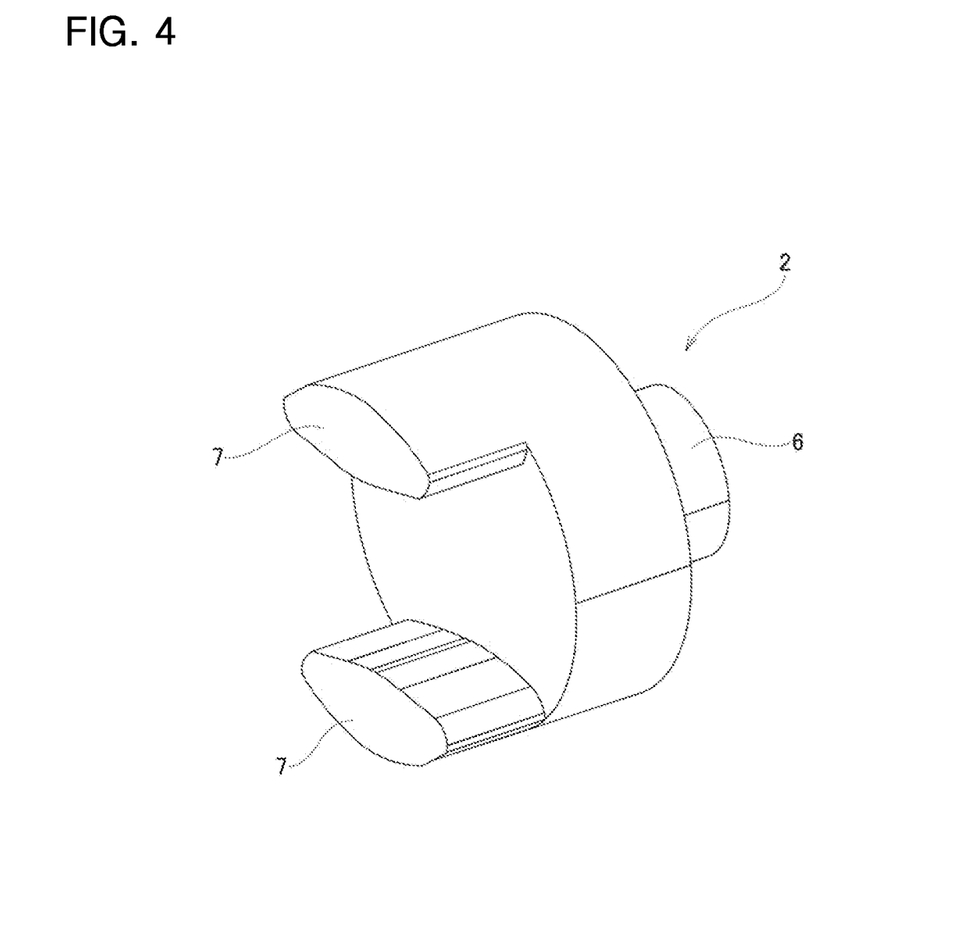
FIG. 4 is a perspective view illustrating a portion of an output member taken out from the reverse input cutoff clutch of this example.

The input member 2 is connected to an input-side mechanism such as an electric motor, and rotational torque is input. As illustrated in FIGS. 2 and 4, the input member 2 has an input shaft portion 6 and a pair of input-side engaging portions 7. The input shaft portion 6 has a stepped cylindrical shape. The base end section of the input shaft portion 6 (right end portion in FIG. 2) is connected to the output portion of the input-side mechanism so as to be able to transmit torque. The pair of input-side engaging portions 7 has an approximately elliptical pillar shape, and it is composed of convex portions extending in the axial direction from two positions on the opposite side in the radial direction of the tip-end surface of the input shaft portion 6 (left end surface in FIG. 2). The pair of input-side engaging portions 7 are separated from each other in the radial direction. As such, the pair of input-side engaging portions 7 are respectively arranged in portions on the tip-end surface of the input shaft portion 6 that are deviated radially outward from the center of rotation. The radially outer surfaces of the input-side engaging portions 7 have the same cylindrical contour as the outer circumferential surface of the tip-end portion of the input shaft portion 6. The radially inward surfaces of the input-side engaging portions 7 are formed by arc-shaped convex surfaces whose center sections in the circumferential direction protrude inward in the radial direction.

Figure 5:
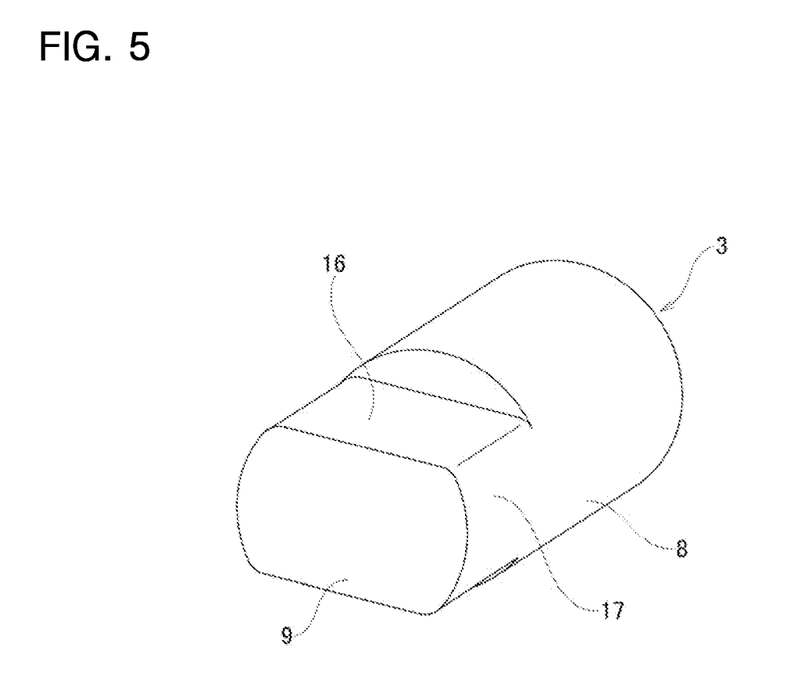
FIG. 5 is a perspective view illustrating a portion of the output member taken out from the reverse input cutoff clutch of this example.

The output member 3 is connected to an output-side mechanism such as a speed reducer, and outputs rotational torque. The output member 3 is arranged coaxially with the input member 2, and as illustrated in FIGS. 2 and 5, has an output shaft portion 8 and an output-side engaging portion 9. The output shaft portion 8 has a cylindrical shape. The base end section of the output shaft portion 8 (left end portion in FIG. 2) is connected to the input section of the output-side mechanism so as to be able to transmit torque. The output-side engaging portion 9 has an approximately elliptic cylindrical shape and extends from the center section of the tip-end surface of the output shaft portion 8 (right-end surface in FIG. 2) in the axial direction. The outer circumferential surface of the output-side engaging portion 9 has side surfaces 16 on both sides in the minor axis direction (vertical direction of FIGS. 1, 6, 8(A), and 8(B)) and a pair of guide surfaces 17 that are side surfaces on both sides in the major axis direction (left-right direction of FIGS. 1, 6, 8(A), and 8(B)).

Both side surfaces 16 are formed of flat surfaces orthogonal to the minor axis direction of the output-side engaging portion 9. Each of the pair of guide surfaces 17 is formed by a convex curved surface. Specifically, each of the pair of guide surfaces 17 is formed by a partially cylindrical convex surface centered on the center axis of the output-side engaging portion 9 (center axis of the output member 3). Further, each of the pair of guide surfaces 17 exists in the same cylindrical surface as the outer circumferential surface of the output shaft portion 8. Therefore, regarding the output member 3, the outer circumferential surface of the round bar material can be used as the outer circumferential surface of the output shaft portion 8 and the pair of guide surfaces 17 so as to be able to reduce the processing cost. However, in a case of implementing the present invention, the convex curved surfaces, which are the pair of guide surfaces, may be partially cylindrical convex surfaces having a radius of curvature smaller than the outer circumferential surface of the output shaft portion, or non-cylindrical convex surfaces such as partially elliptical tubular convex surfaces.

In the output member 3 of this example, the output shaft portion 8 and the output-side engaging portion 9 are integrated, however, in a case of implementing the present invention, the output shaft portion and the output-side engaging portion which are manufactured separately from each other may be connected and fixed to each other to form the output member 3.

The output-side engaging portion 9 is arranged more radially inside than the pair of input-side engaging portions 7, more specifically, it is arranged between the pair of input-side engaging portions 7.

Figure 3:
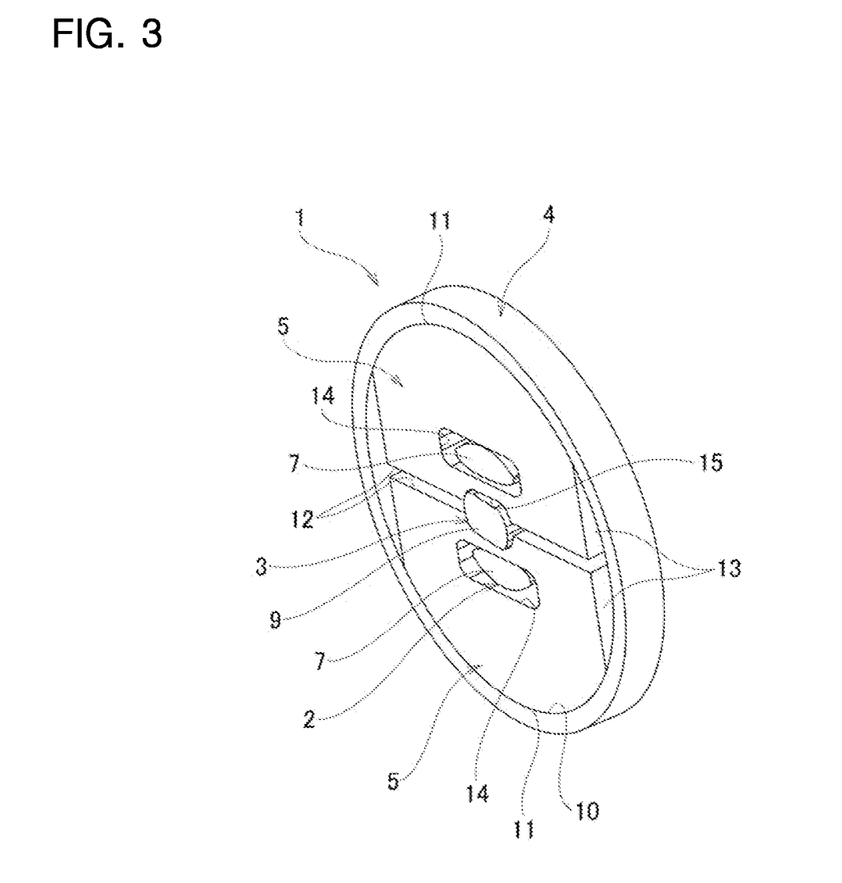
FIG. 3 is a perspective view of the reverse input cutoff clutch of this example.

As illustrated in FIGS. 2 and 3, the pressed member 4 has a thin annular shape and is fixed to another member (not shown) such as a housing, and its rotation is restricted. The pressed member 4 has a pressed surface 10 on its inner circumferential surface. The pressed surface 10 is formed by a cylindrical concave surface. The pressed surface 10 is arranged coaxially with the input member 2 and the output member 3 and radially outside the input member 2 and the output member 3. In other words, the pair of input-side engaging portions 7 and the output-side engaging portion 9 are arranged radially inside the pressed surface 10.

The pair of engaging elements 5 are arranged radially inside the pressed surface 10. Each of the engaging elements 5 has an approximately semicircular plate shape. The radially outer surface of the engaging element 5 is formed of a cylindrical convex surface, and forms the pressing surface 11 that is pressed against the pressed surface 10. Of the radially inward surface of the engaging element 5, a portion other than the portion on which the output-side engaged portions 15 described later is formed forms a flat bottom surface 12. Both side surfaces in the width direction of the engaging element 5 are formed by flat side surfaces 13 perpendicular to the bottom surface 12. The radius of curvature of the pressing surface 11 is equal to or less than the radius of curvature of the pressed surface 10.

Figure 1:
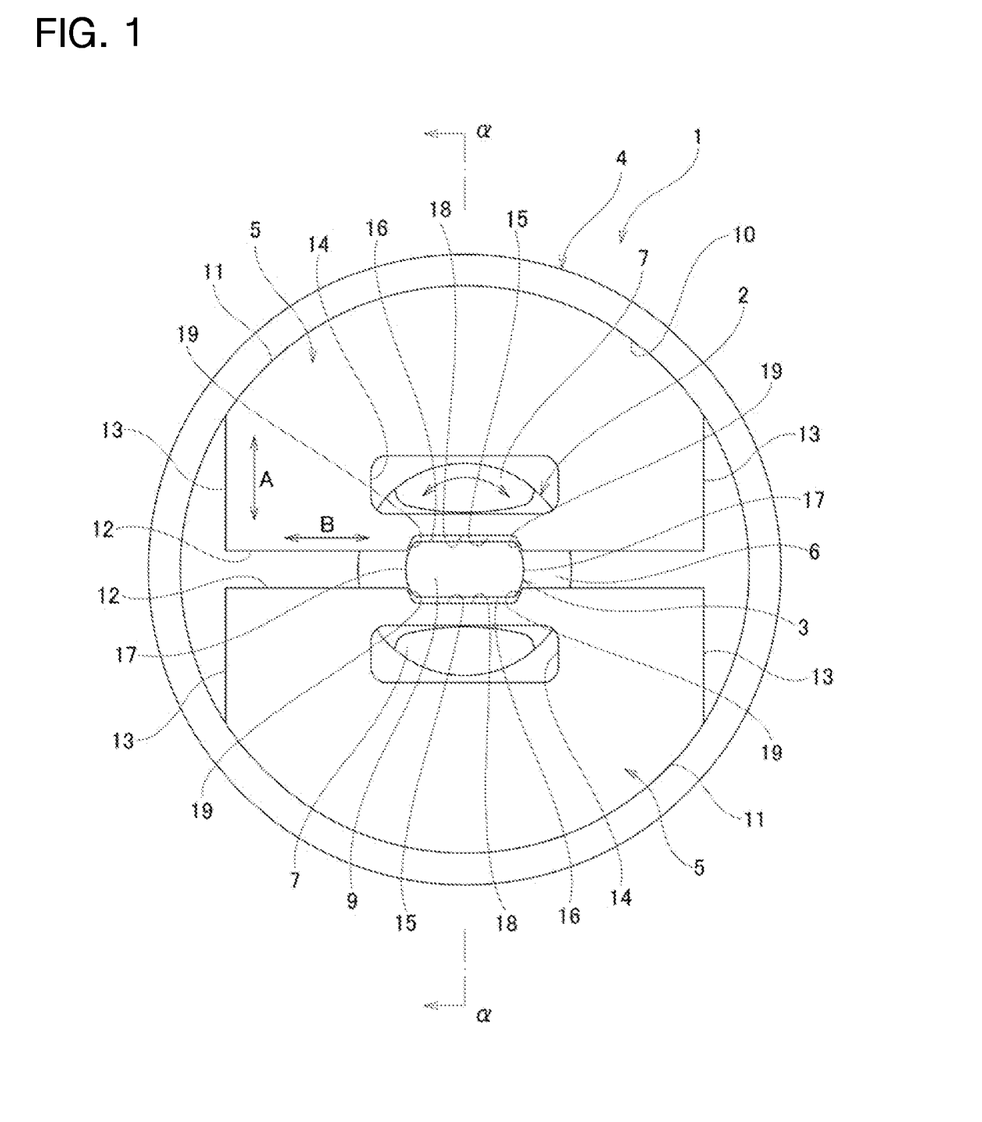
FIG. 1 is a view illustrating a reverse input cutoff clutch according to an example of an embodiment of the present invention.

The radial direction with respect to each engaging element 5 means a direction that is perpendicular to the bottom surface 12 and that is indicated by the arrow A in FIG. 1. Further, the width direction with respect to each engaging element 5 means a direction that is parallel to the bottom surface 12 and that is indicated by the arrow B. In this example, the radial direction with respect to each engaging element 5 corresponds to the first direction as a direction away from or toward the pressed surface 10. The width direction of each engaging element 5 corresponds to the second direction orthogonal to both the first direction and the axial direction of the pressed surface 10.

In this example, the pressing surfaces 11 of the pair of engaging elements 5 are directed to opposite sides from each other with respect to the radial direction of the pressed surface 10, and the bottom surfaces 12 of the engaging elements 5 are facing each other in the radial direction. Further, in a state where the pair of engaging elements 5 are arranged radially inside the pressed surface 10, the inner diameter of the pressed surface 10 and the radial dimension of each engaging element 5 are regulated so that a gap exists at least one of a portion between the pressed surface 10 and the pressing surfaces 11 and a portion between the bottom surfaces 12.

Each engaging element 5 has an input-side engaged portion 14 and an output-side engaged portions 15. In this example, the input-side engaged portion 14 is composed of a through hole which penetrates the middle section in the radial direction of the engaging element 5, the through hole being formed by a rectangular hole which is long in the width direction. The input-side engaged portion 14 has a size that allows the input-side engaging portion 7 to be loosely inserted. More specifically, in a state where the input-side engaging portion 7 is inserted inside the input-side engaged portion 14, a gap in the radial direction of the engaging element 5 and a gap in the width direction of the engaging element 5 exist between the input-side engaging portion 7 and the inner surface of the input-side engaged portion 14. Therefore, the input-side engaging portion 7 can be displaced with respect to the input-side engaged portion 14 (engaging element 5) in the direction of rotation, and the input-side engaged portion 14 (engaging element 5) can be displaced with respect to the input-side engaging portion 7 in the radial direction of the engaging element 5.

The output-side engaged portion 15 is composed of a recessed portion having an approximately rectangular shape that is recessed toward outside in the radial direction from the middle section in the width direction of the bottom surface 12 (radially inside surface on the side far from the pressed surface 10) of each engaging element 5 of the pair of engaging elements 5. As illustrated in FIGS. 1, 6, 8(A), and 8(B), for example, the output-side engaged portion 15 has a size capable of arranging the half-tip portion of the output-side engaging portion 9 in the minor axis direction inside the output-side engaged portion 15.

The inner surface of the output-side engaged portion 15 is composed of a bottom surface 18 and a pair of guided surfaces 19 located at end portions on both sides in the width direction of the engaging element 5 and facing each other in the width direction. The bottom surface 18 is configured by a flat surface orthogonal to the radial direction of the engaging element 5. The pair of guided surfaces 19 is configured by a pair of concave curved surfaces that are inclined in the direction in which the distance between the guided surfaces 19 increases as going toward the radially inside of the engaging element 5, that is, as going toward the direction away from the pressed surface 10 in the radial direction of the engaging element 5. More specifically, the pair of guided surfaces 19 is configured by a pair of concave curved surfaces that can come into contact with the pair of guide surfaces 17 of the output-side engaging portion 9. Each of the guided surfaces 19 is configured by a partially cylindrical concave surface having a radius of curvature equal to that of the guide surfaces 17 or a radius of curvature slightly larger than that of the guide surfaces 17.

Figure 6:
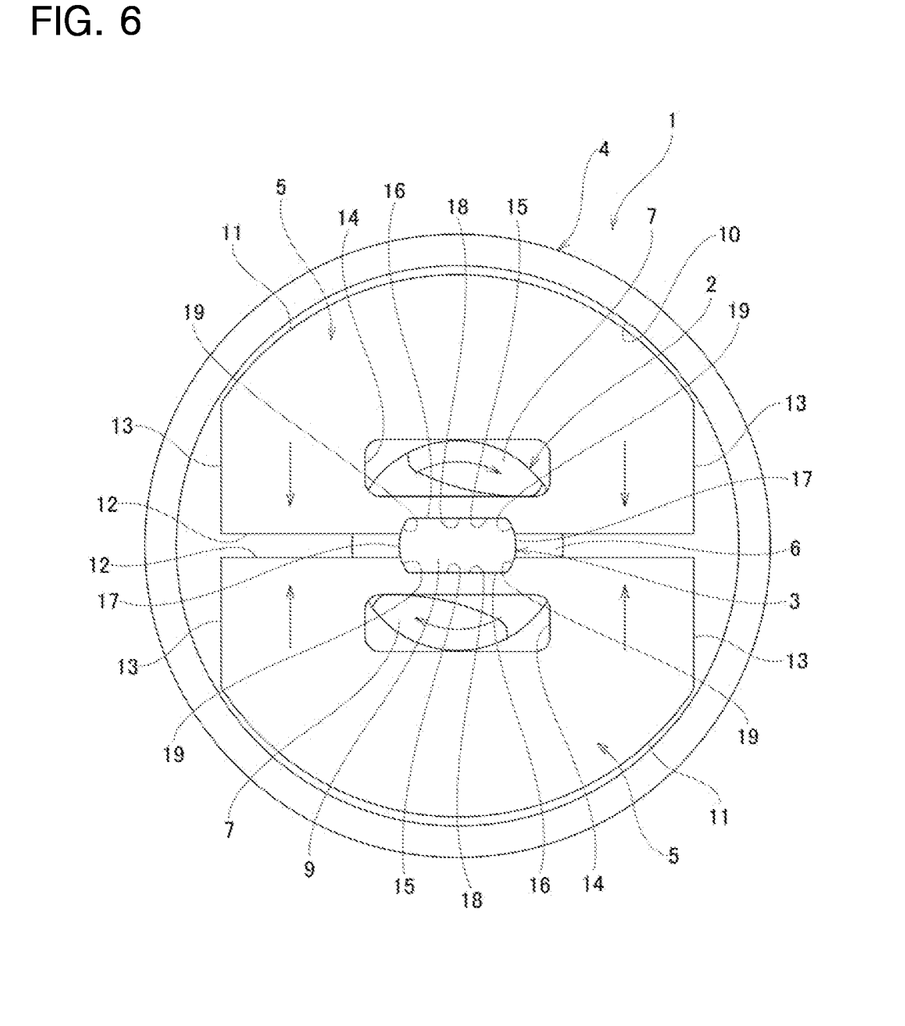
FIG. 6 is a view illustrating a state of the reverse input cutoff clutch of this example in which a rotational torque is input to an input member.

In this example, as illustrated in FIGS. 6 and 8(B), the output-side engaged portion 15 has an inner surface shape that matches the outer circumferential surface of the half-tip portion in the minor axis direction of the output-side engaging portion 9. That is, the bottom surface 18 of the output-side engaged portions 15 can be brought into surface contact with the side surface 16 of the output-side engaging portion 9, and the pair of guided surfaces 19 of the output-side engaged portion 15 can be brought into surface contact with the half-tip portions in the minor axis direction of the pair of guide surfaces 17 of the output-side engaging portion 9. In a case of implementing the present invention, the guided surfaces may be configured by non-cylindrical concave surfaces such as partially elliptical cylindrical concave surfaces.

In the reverse input cutoff clutch 1 of this example, in the assembled state, the pair of input-side engaging portions 7 of the input member 2 arranged on the one side in the axial direction (right side in FIG. 2) are inserted into the input-side engaged portions 14 of the pair of engaging elements 5 in the axial direction, and the output-side engaging portion 9 of the output member 3 arranged on the other side in the axial direction (left side in FIG. 2) is inserted between the pair of output-side engaged portions 15 in the axial direction. That is, the pair of engaging elements 5 are arranged so that the output-side engaged portions 15 sandwich the output-side engaging portion 9 from the outside in the radial direction. Further, in this example, the dimension in the axial direction of the input-side engaging portions 7, the dimension in the axial direction of the output-side engaging portion 9, the dimension in the axial direction of the pressed member 4, and the dimension in the axial direction of the engaging elements 5 are set to be approximately the same.

[Operation Explanation of the Reverse Input Cutoff Clutch]

The operation of the reverse input cutoff clutch 1 of this example will be described.

(When Rotational Torque is Input to the Input Member 2)

The case where rotational torque is input to the input member 2 from the input-side mechanism will be described. As illustrated in FIG. 6, when rotational toque is input to the input member 2, the input-side engaging portions 7 rotate in the direction of rotation of the input member 2 (clockwise in the example of FIG. 6) inside the input-side engaged portions 14. Then, the radially inward surfaces of the input-side engaging portions 7 press the inner surfaces of the input-side engaged portions 14 toward inward in the radial direction and move the pair of engaging elements 5 in a direction away from the pressed surface 10. That is, the pair of engaging elements 5 moves inward in the radial direction, which is a direction approaching each other, based on the engagement between the input-side engaging portions 7 and the input-side engaged portions 14. Due to this, the output-side engaged portions 15 of the pair of engaging elements 5 hold the output-side engaging portion 9 of the output member 3 from both sides in the radial direction, and the output-side engaging portion 9 and the pair of output-side engaged portions 15 engage without looseness. As a result, the rotational torque input to the input member 2 is transmitted to the output member 3 through the pair of engaging elements 5, and is output from the output member 3.

Especially, in the structure of this example, when each engaging element 5 of the pair of engaging elements 5 moves in the direction away from the pressed surface 10 (inward in the radial direction) as described above, as illustrated in FIGS. 1, 6, 8(A), and 8(B), due to the pair of guided surfaces 19 located on both sides in the width direction of the output-side engaged portion 15 are guided by the pair of guide surfaces 17 located on both sides in the major axis direction of the half-tip portion in the minor axis direction of the output-side engaging portion 9, the engaging element 5 is restricted from moving in the width direction.

Figure 7:
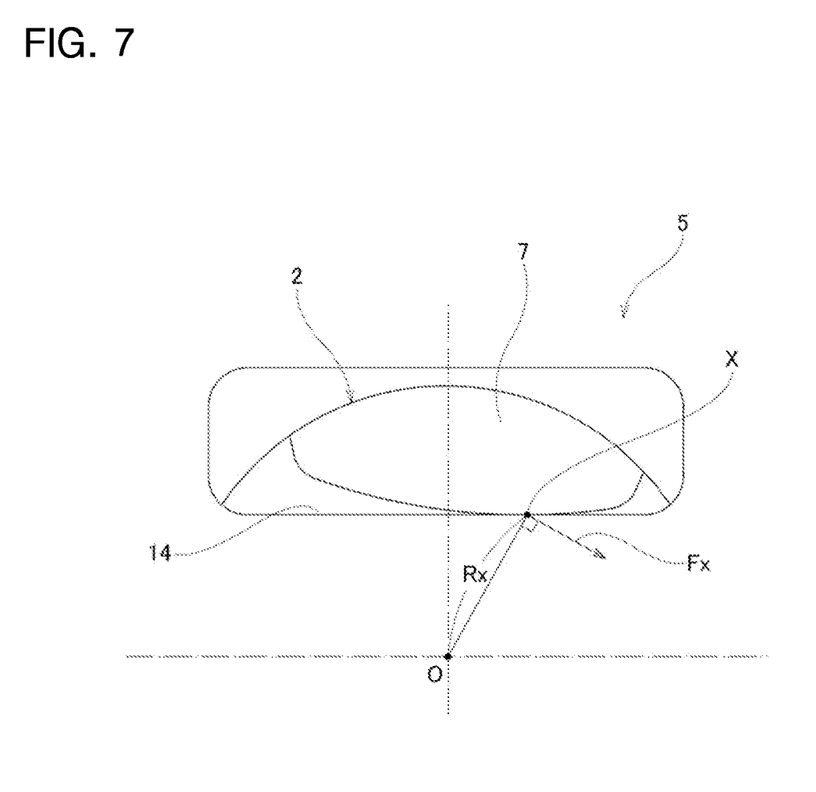
FIG. 7 is an enlarged view of a portion of FIG. 6.
Figure 8:
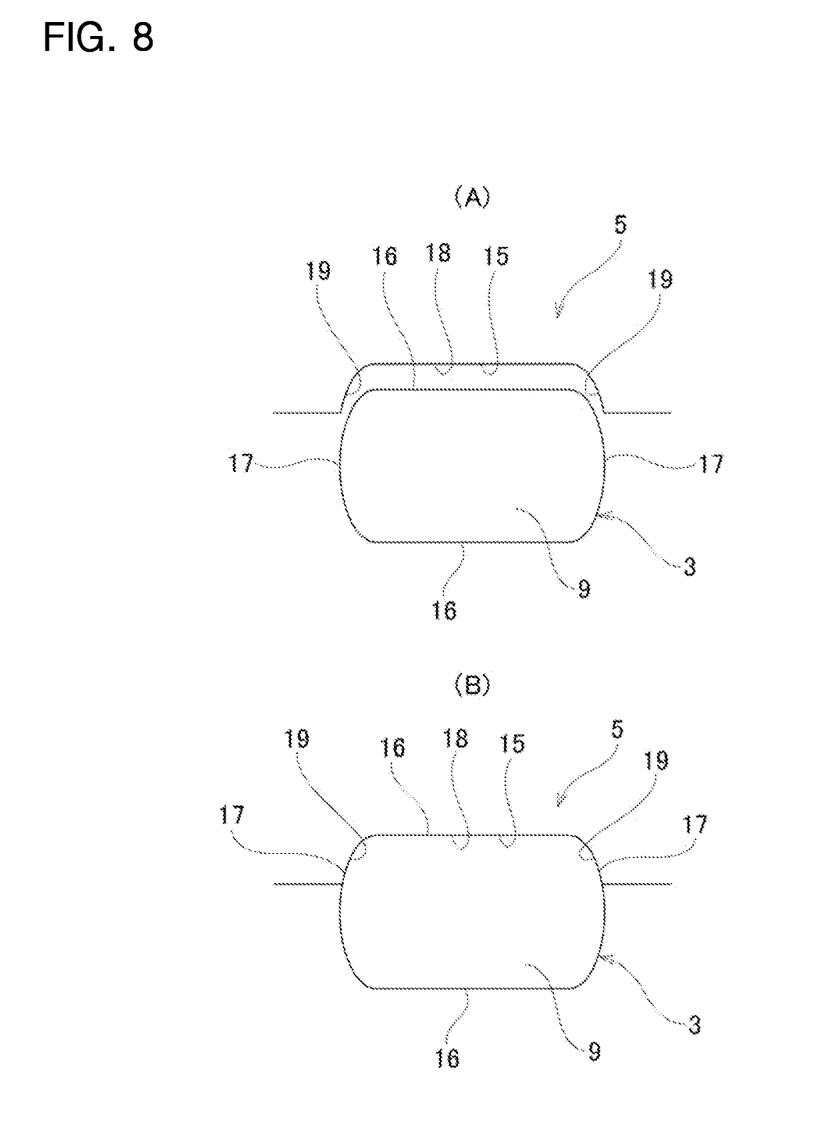
FIG. 8(A) is a view illustrating a state of the reverse input cutoff clutch of this example before an output-side engaging portion and an output-side engaged portion are engaged.
FIG. 8(B) is a view illustrating a state of the reverse input cutoff clutch of this example after the output-side engaging portion and the output-side engaged portion are engaged.

That is, as illustrated in FIG. 7, when the input-side engaging portion 7 comes into contact with the input-side engaged portion 14 by rotational torque being input to the input member 2, a translational load Fx based on the rotational torque T acts on the contact portion X between the input-side engaging portions 7 and the input-side engaged portions 14 (T=Fx·Rx; Rx is a distance from the center of rotation O of the input member 2 to the contact portion X). This translational load Fx includes not only a component that presses the engaging element 5 inward in the radial direction (downward in FIG. 7) but also a component that presses the engaging element 5 in the width direction (rightward in FIG. 7). Therefore, the engaging element 5 tends to move not only radially inward (downward in FIG. 7) but also in the width direction (rightward in FIG. 7) by the translational load Fx.

In the structure of this example, the engaging element 5 is restricted from moving in the width direction by guiding the pair of guided surfaces 19 of the output-side engaged portion 15 by the pair of guide surfaces 17 of the output-side engaging portion 9. Especially, as illustrated in FIGS. 6 and 8(B), in a state where the bottom surface 18 of the output-side engaged portion 15 comes into surface contact with the side surface 16 of the output-side engaging portion 9 and the pair of guided surfaces 19 of the output-side engaged portion 15 come into surface contact with the pair of guide surfaces 17 of the output-side engaging portion 9, the engaging elements 5 are completely blocked from moving in the width direction. Therefore, in the structure of this example, when inputting rotational torque to the input member 2, the engaging element 5 is effectively prevented from shifting in the width direction and coming into contact with the pressed surface 10.

In the structure of this example, the pair of guided surfaces 19 of the output-side engaged portion 15 are configured by a pair of concave curved surfaces that is inclined in a direction in which the distance between each other increases as going toward the radially inside, and the pair of guide surfaces 17 of the output-side engaging portion 9 is configured by a pair of convex curved surfaces that match the pair of guided surfaces 19. Therefore, as illustrated in FIG. 8(A), in a state where the engaging element 5 is separated toward outside in the radial direction from the output-side engaging portion 9, a gap is formed between the pair of guided surfaces 19 and the pair of guide surfaces 17, and the size of the gap (dimension in the width direction) becomes larger toward outside in the radial direction (upper side in FIG. 8(A)). Accordingly, in the structure of this example, in a state where the engaging element 5 is separated toward outside in the radial direction from the output-side engaging portion 9, it is possible to moderately allow the movement of the engaging element 5 in the width direction and the direction of rotation, and it is possible to effectively prevent an excessive force from being applied to the engaging element 5.

(When Rotational Torque is Reversely Input to the Output Member 3)

Figure 9:
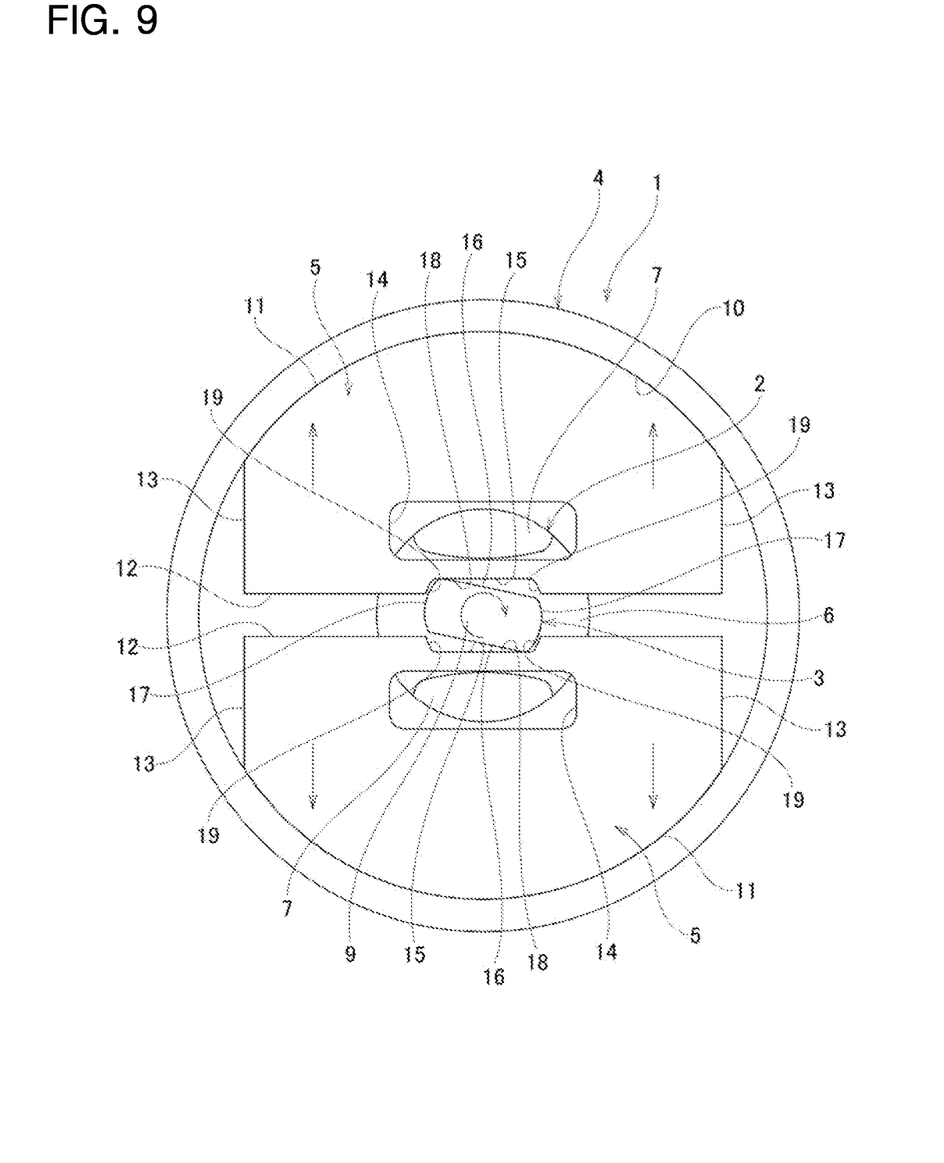
FIG. 9 is a view illustrating a state of the reverse input cutoff clutch of this example in which a rotational torque is reversely input to the output member.

The case where rotational torque is reversely input to the output member 3 from the output-side mechanism will be described. When rotational torque is reversely input to the output member 3, as illustrated in FIG. 9, the output-side engaging portion 9 rotates in the direction of rotation of the output member 3 (clockwise in the example of FIG. 9) inside the pair of output-side engaged portions 15. Then, corner portions that are connecting portions between the side surfaces 16 and the guide surfaces 17 of the output-side engaging portions 9 press the bottom surfaces 18 of the output-side engaged portions 15 toward outward in the radial direction so as to move the pair of engaging elements 5 in a direction approaching the pressed surface 10. That is, the pair of engaging elements 5 move outward in the radial direction, which is a direction away from each other, based on the engagement between the output-side engaging portion 9 and the output-side engaged portions 15. Due to this, the pressing surfaces 11 of the pair of engaging elements 5 are pressed against the pressed surface 10 of the pressed member 4. At this time, the pressing surfaces 11 and the pressed surface 10 come into contact with each other in the entire range or part (for example, center sections) in the circumferential direction of the pressing surfaces 11. As a result, the rotational torque that is reversely input to the output member 3 is transmitted to the pressed member 4 fixed to another member (not shown) so that the rotational torque is completely blocked and is not transmitted to the input member 2, or only a part of the rotational torque that is reversely input to the output member 3 is transmitted to the input member 2 and the rest is cut off.

In order to completely block the rotational torque reversely input to the output member 3 and prevent it from being transmitted to the input member 2, the pair of engaging elements 5 are stretched between the output-side engaging portion 9 and the pressed member 4 so that the pressing surfaces 11 do not slide (relatively rotate) with respect to the pressed surface 10 so as to lock the output member 3. On the other hand, in order to transmit only a part of the rotational torque reversely input to the output member 3 is transmitted to the input member 2 and block the rest, the pair of engaging elements 5 are stretched between the output-side engaging portion 9 and the pressed member 4 so that the pressing surfaces 11 slide with respect to the pressed surface 10 so as to half-lock the output member 3. When rotational torque is further reversely input to the output member 3 in a state where the output member 3 is half-locked, the pair of engaging elements 5 slide the pressing surfaces 11 with respect to the pressed surface 10 based on the engagement between the output-side engaging portion 9 and the output-side engaged portions 15, and rotate around the center of rotation of the output member 3. When the pair of engaging elements 5 rotate, the inner surfaces of the input-side engaged portions 14 press the radially inward surfaces of the input-side engaging portions 7 in the circumferential direction (direction of rotation), and part of the rotational torque is transmitted to the input member 2.

The principle and conditions for locking or half-locking the output member 3 when rotational torque is reversely input to the output member 3 as described above will be more specifically described with reference to FIGS. 10 and 11.

Figure 10:
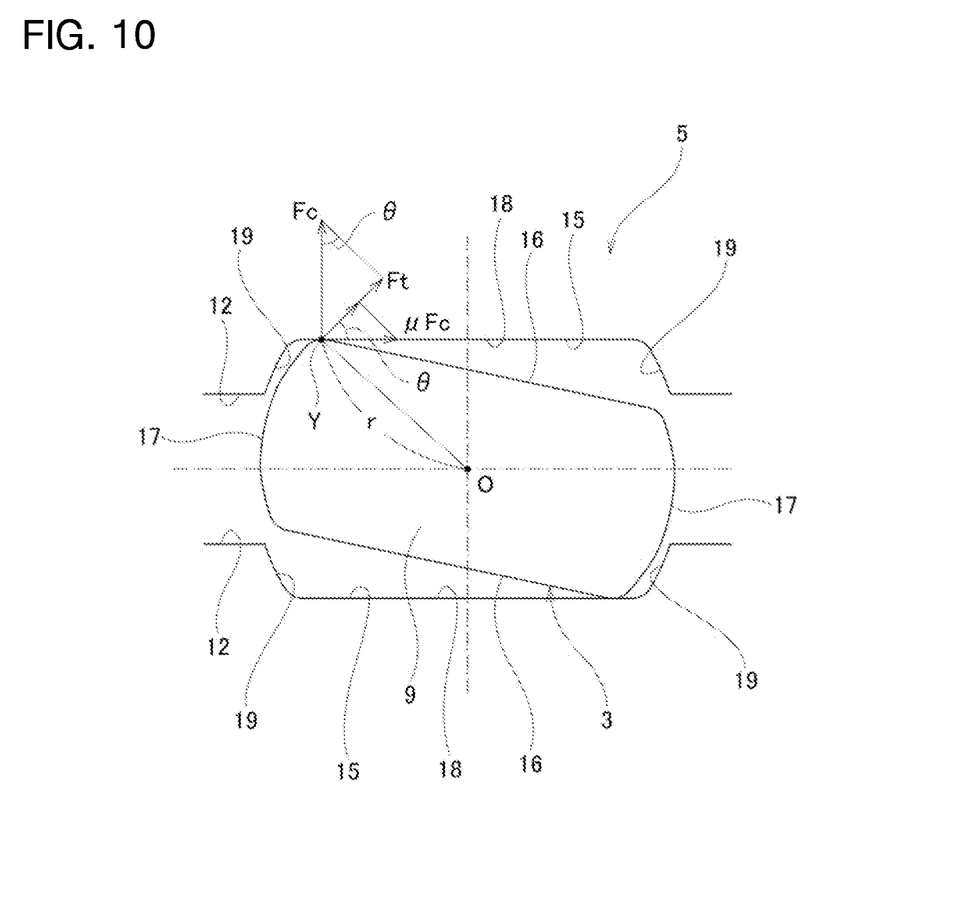
FIG. 10 is an enlarged view of a portion of FIG. 9 illustrating the relationship of a force acting on the engaging element from the output member when a rotational torque is reversely input to the output member.

When the corner portion of the output-side engaging portion 9 comes into contact with the bottom surface of the output-side engaged portion 15 as a result of rotational torque being reversely input to the output member 3, as illustrated in FIG. 10, a normal force Fc acts on the contact portion Y between the corner portion of the output-side engaging portion 9 and the bottom surface 18 of the output-side engaged portion 15 in the direction perpendicular to the bottom surface 18 of the output-side engaged portion 15. Further, assuming that the friction coefficient between the output-side engaging portion 9 and the output-side engaged portion 15 is μ, the friction force μFc acts on the contact portion Y in the direction parallel to the bottom surface 18 of the output-side engaged portion 15. When the wedge angle between the direction of the line of action of the tangential force Ft acting on the contact portion Y and the bottom surface 18 of the output-side engaged portion 15 is θ, the tangential force Ft is expressed by the following equation (1).

$$Ft = Fc \cdot \sin\theta + \mu Fc \cdot \cos\theta \quad (1)$$

Therefore, the normal force Fc is expressed by the following equation (2) using the tangential force Ft.

$$Fc = Ft/(\sin\theta + \mu \cdot \cos\theta) \quad (2)$$

The magnitude of the torque T transmitted to the engaging elements 5 from the output member 3 when the corner portion of the output-side engaging portion 9 comes into contact with the bottom surface 18 of the output-side engaged portion 15 is expressed by the following equation (3) when the distance from the center of rotation O of the output member 3 to the contact portion Y is r.

$$T = r \cdot Ft \quad (3)$$

Figure 11:
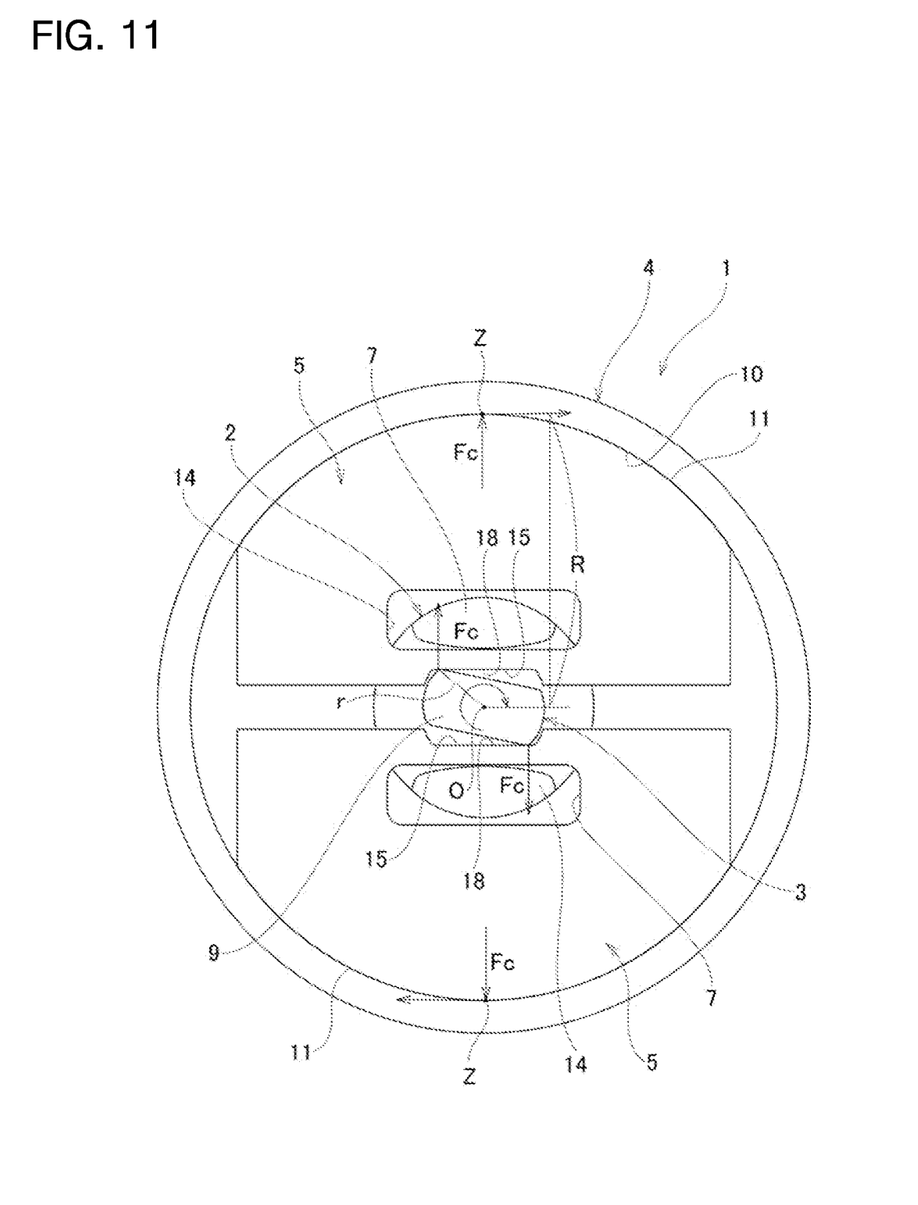
FIG. 11 is a view of the reverse input cutoff clutch of this example illustrated in order to explain conditions for the output member to be locked or half-locked when a rotational torque is reversely input to the output member.

As described above, since the normal force Fc acts on the contact portion Y, as illustrated in FIG. 11, the pressing surface 11 of the engaging element 5 is pressed to the pressed surface 10 of the pressed member 4 by the force of the normal force Fc. Therefore, when the friction coefficient between the pressing surface 11 and the pressed surface 10 is μ' and the distance from the center of rotation O of the output member 3 to the contact portion Z between the pressing surface 11 and the pressed surface 10 is R, the magnitude of the brake torque T' that acts on the engaging elements 5 is expressed by the following equation (4).

$$T' = \mu' R Fc \quad (4)$$

Accordingly, it can be seen that the friction coefficient μ', the distance R, and the normal force Fc should be increased in order to obtain a larger braking force.

In order to prevent the rotational torque that is input to the output member 3 from being transmitted to the input member 2 by locking the output member 3, the transmission torque T and the brake torque T' are required to meet the relationship of the following equation (5).

$$T < T' \quad (5)$$

Substituting the above equations (1) to (4) into the above equation (5) gives the following equation (6).

$$\mu' R/(\sin\theta + \mu \cdot \cos\theta) > r \quad (6)$$

From the above equation (6), it can be seen that if the friction coefficient μ' between the pressing surface 11 and the pressed surface 10 is increased, the output member 3 can be locked even if the distance R is decreased.

Assuming that the friction coefficient μ and the friction coefficient μ' are both 0.1, the following equation (7) is obtained from the above equation (6).

$$R > 10r(\sin\theta + 0.1\cos\theta) \quad (7)$$

From the above equation (7), it can be seen that the output member 3 can be locked by appropriately setting the distance r from the center of rotation O of the output member 3 to the contact portion Y, the distance R from the center of rotation O of the output member 3 to the contact portion Z, and the wedge angle θ between the direction of the line of action of the tangential force Ft and the bottom surface 18 of the output-side engaged portion 15.

On the other hand, in order to allow only a part of the rotational torque reversely input to the output member 3 is transmitted to the input member 2 and the rest is blocked by half-locking the output member 3, the transmission torque T and the brake torque T' are required to meet the relationship of the following equation (8).

$$T > T' \quad (8)$$

As apparent from the above equation (6), the output member 3 can be half-locked by appropriately setting the friction coefficient μ between the output-side engaging portion 9 and the output-side engaged portion 15, the friction coefficient μ' between the pressing surface 11 and the pressed surface 10, the distance r from the center of rotation O to the contact portion Y, the distance R from the center of rotation O to the contact portion Z, and the wedge angle θ between the direction of the line of action of the tangential force Ft and the bottom surface 18 of the output-side engaged portion 15.

In the case where rotational torque is input to the input member 2 when the output member 3 is locked or half-locked, when the normal force acting on the engaging elements 5 from the input member 2 becomes larger than the normal force Fc acting on the engaging elements 5 from the output member 3, the output member 3 is released from being locked or semi-locked. That is, the pair of engaging elements 5 move inward in the radial direction and rotational torque is transmitted from the input member 2 to the output member 3.

With the reverse input cutoff clutch 1 of this example, the state in which the rotation of the output member 3 is prevented or suppressed, that is, the locked or half-locked state as illustrated in FIG. 9 can be released easily.

That is, in the reverse input cutoff clutch 1 of this example, since the force acting on the engaging elements 5 from the input member 2 and the force acting on the engaging elements 5 from the output member 3 are reversed in the radial direction, it is possible to control the moving direction of the engaging elements 5 by regulating the magnitude relationship between both forces. Therefore, the switching operation between the locked or half-locked state as illustrated in FIG. 9 and the unlocked state as illustrated in FIG. 6 can be stably performed. Accordingly, unlike the conventional reverse input cutoff clutch described in JP 2007-232095A, it is possible to prevent the inconvenience that the rollers remain bitten in the narrow portion of the wedge-shaped space and the lock cannot be released.

In the structure of this example, each engaging element 5 is effectively prevented from contacting the pressed surface 10 in the width direction since each engaging element 5 of the pair of engaging elements 5 is restricted from moving in the width direction due to the pair of guided surfaces 19 of the output-side engaged portion 15 being guided by the pair of guide surfaces 17 of the output-side engaging portion 9 when rotational torque is input to the input member 2 and the pair of engaging elements 5 move in a direction away from the pressed surface 10 (inward in the radial direction). Therefore, switching between the locked or half-locked state and the unlocked state can be performed more stably when rotational torque being input to the input member 2.

The reverse input cutoff clutch 1 of this example includes a pair of input-side engaging portions 7 and a pair of engaging elements 5. That is, the number of the engaging elements is two. However, in a case of implementing the present invention, the number of the input-side engaging portion and the engaging element is not limited to two, and may be one each or more than three respectively.

Although it is different from the structure of this example, it may be possible to employ a structure in which a dedicated guide member (separate from the output-side engaging portion) is provided between the pair of engaging elements, and when the engaging elements move inward in the radial direction, the engaging elements are restricted from moving in the width direction by the guide member. However, in a case of employing such a structure, as the guide member is used, the number of parts increases and the cost may increase. On the other hand, in the structure of this example, since the movement of the pair of engaging elements 5 toward inward in the radial direction can be guided by using the output-side engaging portion 9, the number of parts can be reduced as compared with the structure using the guide member.

Although it is different from the structure of this example, it may be also possible to employ a structure in which a guide mechanism is configured by engaging a guide portion on one side such as a concave portion formed on one engaging element of the pair of engaging elements with another guide portion on the other side such as a convex portion formed on the other engaging element of the pair of engaging elements, and the engaging elements are restricted from moving in the width direction by the guide mechanism. However, in a case of employing such a structure, there is a possibility that the management cost of the parts may increase since it is required to prepare two types of engaging elements having different shapes as a pair of engaging elements. On the other hand, in the structure of this example, since the movement of the pair of engaging elements 5 toward inward in the radial direction can be performed by using the output-side engaging portion 9, it is possible to use members having the same shape as the pair of engaging elements 5. Therefore, the management cost of the parts can be suppressed.

In a case of implementing the reverse input cutoff clutch of the present invention, it is also possible to employ a structure in which a pair of pressing surfaces which are pressed against the pressed surface are arranged at two locations separated in the circumferential direction of the radially outer surface of each engaging element of the pair of engaging elements, and a portion located between the pair of pressing surfaces in the circumferential direction of the radially outer surface of each engaging element is a noncontact surface that does not come into contact with the pressed surface. If such a structure is adopted, the frictional engagement force between the pressed surface and the pressing surfaces can be increased due to the wedge effect when rotational torque is reversely input to the output member.

In a case of implementing the reverse input cutoff clutch of the present invention, it is also possible to incorporate a spring that elastically biases the pair of engaging elements in a direction that brings the pair of engaging elements closer to the pressed surface. If such a structure is adopted, in a neutral state where no torque is applied to either the input member or the output member, the pressing surfaces of the engaging elements can be kept in contact with the pressed surface. As a result, when rotational torque is reversely input to the output member, the locked state can be achieved immediately.

REFERENCE SIGNS LIST

1 Reverse input cutoff clutch
2 Input member
3 Output member
4 Pressed member
5 Engaging element
6 Input shaft portion
7 Input-side engaging portion
8 Output shaft portion
9 Output-side engaging portion
10 Pressed surface
11 Pressing surface
12 Bottom surface
13 Side surface
14 Input-side engaged portion
15 Output-side engaged portion
16 Side surface
17 Guide surface
18 Bottom surface
19 Guided surface

The invention claimed is:

1. A reverse input cutoff clutch comprising:
a pressed member having a pressed surface on an inner circumferential surface thereof,
an input member having at least one input-side engaging portion arranged radially inside the pressed surface, the input member being arranged coaxially with the pressed surface,
an output member having an output-side engaging portion arranged radially inside the pressed surface and more radially inside than the input-side engaging portion, the output member being arranged coaxially with the pressed surface, and
at least one engaging element arranged radially inside the pressed surface so as to move in a first direction as a direction away from or toward the pressed surface, and having at least one pressing surface facing the pressed surface, an input-side engaged portion that engages with the input-side engaging portion, and an output-side engaged portion that engages with the output-side engaging portion,
the engaging element displacing so as to move away from the pressed surface based on engagement between the input-side engaging portion and the input-side engaged portion when rotational torque is input to the input member, and transmitting rotational torque input to the input member to the output member by engaging the output-side engaged portions with the output-side engaging portion, and when rotational torque is reversely input to the output member, based on engagement between the output-side engaging portion and the output-side engaging portion, the engaging element frictionally engaging the pressing surface with the pressed surface by pressing the pressing surface against the pressed surface,
wherein
the output-side engaged portion is composed of a recessed portion provided on a side surface on a side far from the pressed surface in the first direction of the engaging element,
the recessed portion has an interior surface comprising a bottom surface configured by a flat surface orthogonal to the first direction, and a pair of guided surfaces provided on both side portions in a second direction orthogonal to both the first direction and an axial direction of the pressed surface and facing each other in the second direction,
the output-side engaging portion has a flat side surface and a pair of guide surfaces provided at two locations facing the pair of guided surfaces,
the pair of guided surfaces are configured by a pair of concave curved surfaces that are inclined in a direction in which a distance between each other increases in the direction away from the pressed surface with regard to the first direction, and the pair of guide surfaces are configured by a pair of convex curved surfaces that is able to contact the pair of concave curved surfaces,
the engaging elements is restricted from moving in the second direction due to the pair of guided surfaces being guided by the pair of guide surfaces when the engaging element displaces in a direction away from the pressed surface with regard to the first direction due to rotational torque being input to the input member, and
when rotational torque is input to the input member, the bottom surface of the output-side engaged portions is brought into surface contact with the side surface of the output-side engaging portion, and the pair of guided surfaces of the output-side engaged portion is brought into surface contact with the pair of guide surfaces of the output-side engaging portion, such that the engaging element is completely blocked from moving in the second direction.

2. The reverse input cutoff clutch according to claim 1, wherein a pair of the input-side engaging portions and a pair of the engaging elements are provided so as to sandwich the output-side engaging portion from both sides in the radial direction.

* * * * *